United States Patent
Matsumura

(10) Patent No.: US 9,028,697 B2
(45) Date of Patent: May 12, 2015

(54) METHODS AND APPARATUS FOR CONTROLLING MOISTURE IN PLANT OILS AND LIQUID BIOFUELS

(76) Inventor: Masatoshi Matsumura, Kawasaki (JP)

( * ) Notice: Subject to any disclaimer, the term of this patent is extended or adjusted under 35 U.S.C. 154(b) by 0 days.

(21) Appl. No.: 13/982,475

(22) PCT Filed: Jan. 25, 2012

(86) PCT No.: PCT/US2012/022518
§ 371 (c)(1),
(2), (4) Date: Jul. 29, 2013

(87) PCT Pub. No.: WO2012/106158
PCT Pub. Date: Aug. 9, 2012

(65) Prior Publication Data
US 2013/0305592 A1    Nov. 21, 2013

Related U.S. Application Data

(60) Provisional application No. 61/438,634, filed on Feb. 1, 2011.

(51) Int. Cl.
*B01D 11/04*    (2006.01)
*B01D 61/24*    (2006.01)
(Continued)

(52) U.S. Cl.
CPC ............ *C10G 33/04* (2013.01); *B01D 11/0492* (2013.01); *B01D 17/0202* (2013.01);
(Continued)

(58) Field of Classification Search
CPC ........... B01D 11/0415; B01D 11/0492; B01D 17/0202; B01D 61/246; B01D 61/24; B01D 61/243; C11B 3/006; C11B 3/008; C10L 1/026; C07C 31/22; C07C 31/225; C07C 37/88

USPC .............. 210/634, 639, 644, 739, 770, 257.2, 210/651, 805; 554/20, 21, 31, 176, 206, 554/175; 44/301, 307, 605; 568/852, 868, 568/869; 208/187, 188
See application file for complete search history.

(56) References Cited

U.S. PATENT DOCUMENTS 1,885,393 A * 11/1932 Van Schaack, Jr. ............ 210/644
3,919,075 A * 11/1975 Parc et al. ...................... 208/180
(Continued)

FOREIGN PATENT DOCUMENTS

JP    59-210893    11/1984
JP    10-182518    7/1998
(Continued)

OTHER PUBLICATIONS

Publication: Michael Cooney et al, "Extraction of Bio-oils from Microalgae", Separation & Purification Reviews, vol. 28, pp. 291-321, 2009.*
(Continued)

*Primary Examiner* — Joseph Drodge
(74) *Attorney, Agent, or Firm* — Foley & Lardner LLP

(57) ABSTRACT

The moisture absorption capacity of biofuels can be more or less 10 times that of fossil diesel oil, causing biofuels to form acids that induce metal corrosion and form deposits in the fuel tank and pipe lines. Methods for removing moisture from stored biofuels and plant oils are described wherein glycerol is used as a solvent to extract the moisture from the bioliquid or oil, comprising the steps of placing the biofuel or oil in fluid contact with glycerol, incubating for a time, and then removing the glycerol. A cellulous ester dialysis or other semipermeable membrane may be used to prevent the glycerol from contaminating the biofuel while allowing moisture to pass. Crude glycerol produced as a byproduct of biodiesel production may be used in the method of the disclosed invention with good result. Preferred embodiments of apparatus that employ the method of the subject invention are described.

18 Claims, 14 Drawing Sheets

(51) Int. Cl.
*C10L 1/02* (2006.01)
*C11B 3/00* (2006.01)
*C10G 33/04* (2006.01)
*B01D 17/02* (2006.01)

(52) U.S. Cl.
CPC .......... *B01D17/0214* (2013.01); *B01D 61/246* (2013.01); *C10L 1/026* (2013.01); *C11B 3/006* (2013.01); *Y02E 50/13* (2013.01)

(56) References Cited

U.S. PATENT DOCUMENTS

| | | | |
|---|---|---|---|
| 3,956,112 A * | 5/1976 | Lee et al. | 210/644 |
| 6,471,869 B1 * | 10/2002 | Yanou et al. | 210/651 |
| 6,517,725 B2 * | 2/2003 | Spearman et al. | 210/640 |
| 8,142,659 B2 * | 3/2012 | Kale | 210/634 |
| 8,192,627 B2 * | 6/2012 | Gallop et al. | 210/634 |
| 8,394,900 B2 * | 3/2013 | Abhari | 526/75 |
| 8,486,267 B2 * | 7/2013 | Seibert et al. | 210/644 |
| 8,487,148 B2 * | 7/2013 | Roberts et al. | 585/240 |
| 2006/0063242 A1 * | 3/2006 | Chou | 435/135 |
| 2007/0033863 A1 * | 2/2007 | Butler | 44/451 |
| 2007/0175092 A1 * | 8/2007 | Ames | 44/629 |
| 2007/0205155 A1 * | 9/2007 | Babcock et al. | 210/644 |
| 2008/0092435 A1 * | 4/2008 | Bzdek et al. | 44/301 |
| 2008/0250700 A1 * | 10/2008 | Tremblay et al. | 44/301 |
| 2010/0132252 A1 * | 6/2010 | Nakazono | 44/388 |
| 2011/0263886 A1 | 10/2011 | Kale | |

FOREIGN PATENT DOCUMENTS

| | | |
|---|---|---|
| JP | 2008-266418 | 11/2008 |
| WO | WO-2010-090965 | 8/2010 |

OTHER PUBLICATIONS

International Search Report and Written Opinion for PCT/US2012/022518 dated Aug. 9, 2012.

* cited by examiner

Schematic of glycerin splitting using phosphoric acid

Glycerol in CE tubing ready for immersion

FIG. 4 Immersion of glycerol-filled CE membrane tubing in sunflower biodiesel, the left side view taken from the top opening of the container.

Moisture content reduction in sunflower BDF using 10% pure, crude and phosphoric-acid glycerol

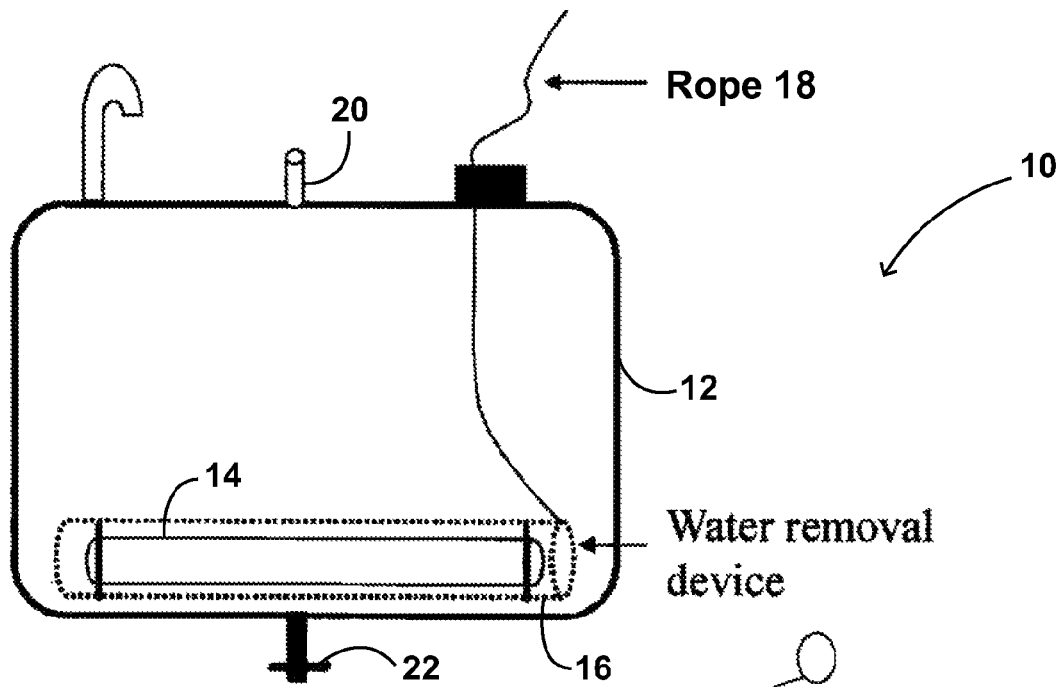
Strage tank internal view after installing water removal device
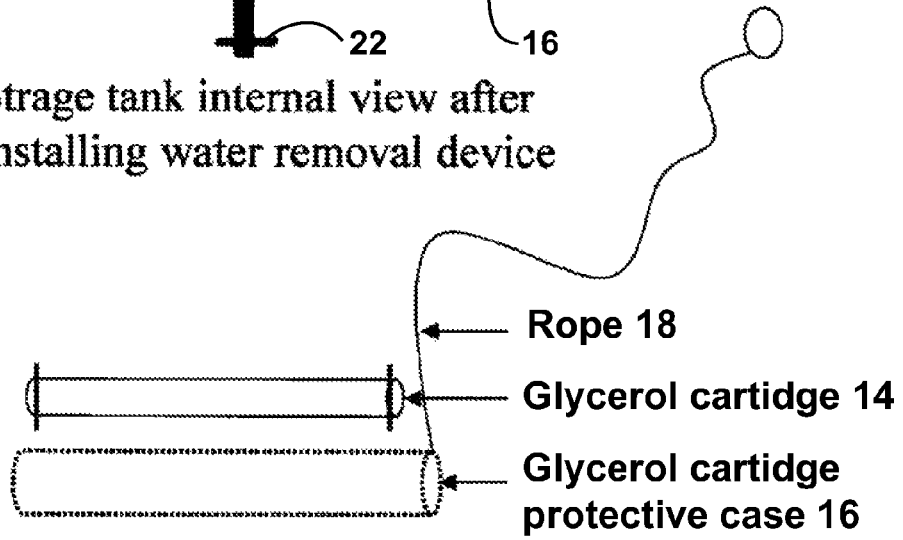
Water removal device
FIG. 13

METHODS AND APPARATUS FOR CONTROLLING MOISTURE IN PLANT OILS AND LIQUID BIOFUELS

CROSS-REFERENCE

This patent application is a U.S. national stage application of International Application No. PCT/US2012/022518, filed on Jan. 25, 2012, which in turn claims the benefit of U.S. Provisional Application No. 61/438,634 filed 1 Feb. 2011 entitled "Method and Apparatus for Controlling Moisture Content in Biodiesel and Other Bio-Fuels During Storage," the contents of which are incorporated herein in their entirety by this reference.

BACKGROUND OF THE INVENTION

1. Technical Field

The invention disclosed herein generally relates to the removal of moisture from plant oils and liquid biofuels, also referred to as bioliquids. More specifically, this invention describes the use of glycerol as a solvent for the extraction of moisture from plant oils, including high value oils such as bio-oil (woody biomass based oil), and bioliquids, including biofuels such as biodiesel, and bio-kerosene, prior to and during storage.

2. Background Art

Glycerol is a clear, odorless, viscous liquid with a naturally sweet taste. It is derived from both natural and petrochemical feedstocks. Glycerol occurs in combined form (triglycerides) in animal fats and vegetable oils and is obtained from these fats and oils during transesterification including, for example, during biodiesel production. Glycerol is an inherent side product of this process along with a monovalent alcohol (methanol, ethanol, etc.) and fatty acid alkyl esters, as is shown in the formula set forth below.

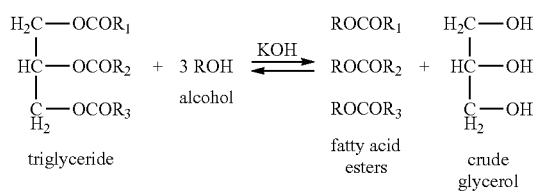

Using stoichiometry, it can be calculated that 10% glycerol is formed during transesterification. However, this value holds for pure glycerol. The so-called crude glycerol that is a byproduct of biodiesel synthesis usually has a purity of between 55% and 90%, while the larger biodiesel plants tend to produce crude glycerol with the highest purities, often around 75%-80%. The remainder of the crude glycerol consists primarily of unconverted triglycerides, unconverted methanol, biodiesel, soaps and contamination. This dilution by impurities means that the actual amount of glycerol is much larger, between 100/90 (1.1) and 100/55 (1.8) times as much.

Typical composition data for biodiesel-derived glycerol are given in Table 1 below. Most of the contaminants can be traced back to the biodiesel synthesis process, for example the unreacted methanol that was not completely evaporated. The concentrations of Na and K indicate whether caustic soda (NaOH) or potash lye (KOH) was used as a catalyst for the transesterification. Alkali metals like Na, K, Ca and Mg are naturally present in vegetable oils. Sulfate and phosphate may remain from neutralization of the mixture with sulfuric or phosphoric acid.

TABLE 1

Typical composition of crude glycerol from biodiesel production

| Property | Value | Unit |
|---|---|---|
| Glycerol content | 77-90% | wt % |
| Ash content | 3.5-7% | wt % |
| Moisture content | 0.1-13.5% | wt % |
| Lower calorific value | 14.9-17.5 | MJ/kg |
| Kinematic viscosity | 120 | $mm^2/s$ |
| 3-monopropylenediol | 200-13,500 | ppm |
| Methanol | 0.01-3.0% | wt % |
| MONG | 1.6-7.5% | wt % |
| pH | 4.5-7.4 | |
| Sulfate | 0.01-1.04 | wt % |
| Phosphate | 0.02-1.45 | wt % |
| Acetate | 0.01-6.0 | wt % |
| Na | 0.4-20 | g/kg |
| K | 0.03-40 | g/kg |
| Ca | 0.1-65 | mg/kg |
| Mg | 0.02-55 | mg/kg |
| Fe | 0.1-30 | mg/kg |
| Mn | <0.5 | mg/kg |

With the increase in renewable fuel production over the years, particularly biodiesel, comes an overabundance of off-grade glycerol. The supply of crude glycerol has nearly doubled while demand for the product has remained largely unchanged. This excess supply and limited demand has caused glycerol prices to remain depressed.

Glycerol continues to be one of the most versatile and valuable byproducts created during biodiesel production. Glycerol currently has innumerable known uses in many different industries ranging from foods, pharmaceuticals, and cosmetics to paints, coatings and other industrial types of applications. Businesses and researchers from around the globe are currently engaged in research and development projects, with the primary goal of developing economically viable technologies capable of utilizing this overabundant resource. Among these are: utilization of glycerol as a fuel to power generators; as a feedstock for plastics; and, as a carbon source for the production of omega-3 fatty acids. These new forms of commercialization should increase the profits of biodiesel producers by creating a new revenue streams.

However, in all the above-mentioned applications, whether as a reactant or as an additive, glycerol is principally used as a highly refined and purified product. Thus, if it is used in food, cosmetics and drugs, for example, further purifications are needed such as bleaching, deodorizing, and ion exchange to remove trace impurities. Purifying glycerol to this stage, however, is very costly and generally out of the range of economic feasibility for biodiesel plants. Hence, as more and more crude glycerol is generated by the biodiesel industry, it is very important that economical ways of utilizing crude or low-grade glycerol be explored to make biodiesel production more competitive in the growing global market. (Wolfson et al, 2009), for example, have successfully employed crude glycerol from triglyceride alcoholysis as a green solvent in base catalyzed aldol condensation and palladium catalyzed Heck carbon-carbon coupling without any purification.

It is an object of this present invention to identify commercial valuable uses for crude glycerol, including for example crude glycerol formed as a byproduct of bioliquid production, through its ability to remove excessive water from biodiesel fuels and plant oils.

Biodiesel may contain small but problematic quantities of water. Although, it is not miscible in water, biodiesel is hygroscopic (absorbs water from atmospheric moisture). Moisture saturation in biodiesel ranges from 0.10 to 0.17% wt (1,000 to 1,700 ppm) in the temperature range of 4 to 35° C., which is 15 to 25 times higher than that of fossil diesel (Thompson et. al, 2006). One of the reasons biodiesel tends to absorb water is the persistence of mono- and diglycerides left over from incomplete reaction. These molecules can act as an emulsifier, allowing water to mix with biodiesel. In addition, there may be water that is residual to processing or resulting from storage tank condensation.

The presence of water is a problem because it reduces the heat combustion of the bulk fuel, causes corrosion of vital system components (fuel and injector pumps, fuel lines, etc.), accelerates the growth of microbe colonies that can plug up fuel systems and causes pitting of the piston in diesel engines.

Current methods to reduce the water content in BDF below 500 ppm involves heating the wet biodiesel at 50° C. for 1 hour but this requires energy for heating (Nur et al, 2008). As energy is a significant global issue, and especially sensitive in the context of promoting the use of biodiesel, it is important to find alternative methods for removing water from biodiesel other than heating which is a high energy-consuming process.

A further object of the subject invention is to identify ways to remove moisture from stored biofuels and plant oils that are economically feasible and energy efficient.

It is a further object of the claimed invention to describe and disclose a simple and economically viable technology to absorb water from biodiesel, other bioliquids and plant oils using crude glycerol obtained as a byproduct of bioliquid production.

SUMMARY OF THE INVENTION

The moisture absorption capacity of biodiesel (BDF) is more or less 10 times higher than that of fossil diesel oil. High moisture content enhances the hydrolysis of BDF to form formic and acetic acids. These acids induce metal corrosion and form deposits in the fuel tank and fuel pipe lines.

Measuring the distribution curve of water between BDF and glycerol demonstrates that glycerol, which is a byproduct of BDF production, functions as an excellent moisture absorbent. Equilibrium moisture content in glycerol is 200 times higher than that in BDF. Therefore, moisture in BDF can be very easily removed by adding a small amount of glycerol, and the regeneration of used glycerol is also very simple; simply boiling the used glycerol. However, the regulation of residual glycerol in BDF is very strict, required to be lower than 200 ppm. This quality control standard for glycerol free BDF is employed worldwide.

The present invention comprises a new method for the control of moisture in BDF, other bio-fuels and plant oils using a membrane aided solvent extraction technique employing crude glycerol. The membrane, having a molecular number cut-off smaller than the molecular weight of glycerol, prevents the permeation of glycerol into bio-fuels.

The method of the described invention can be applied to control moisture content in, and remove moisture from, all varieties of oils including, for example, plant oils, oils derived from microorganisms and oils derived from algae.

The present invention also comprises apparatus employing the appropriate membrane that places bioliquid or plant oil in fluid communication with crude glycerol through the semipermeable membrane.

BRIEF DESCRIPTION OF DRAWINGS

FIG. 13 illustrates a first preferred embodiment of an apparatus 10 for the removal of moisture from bioliquids and plant oils that can be used, for example, in the fuel tanks of motor vehicles.

DESCRIPTION OF EMBODIMENTS AND INDUSTRIAL APPLICABILITY

Figure 1:
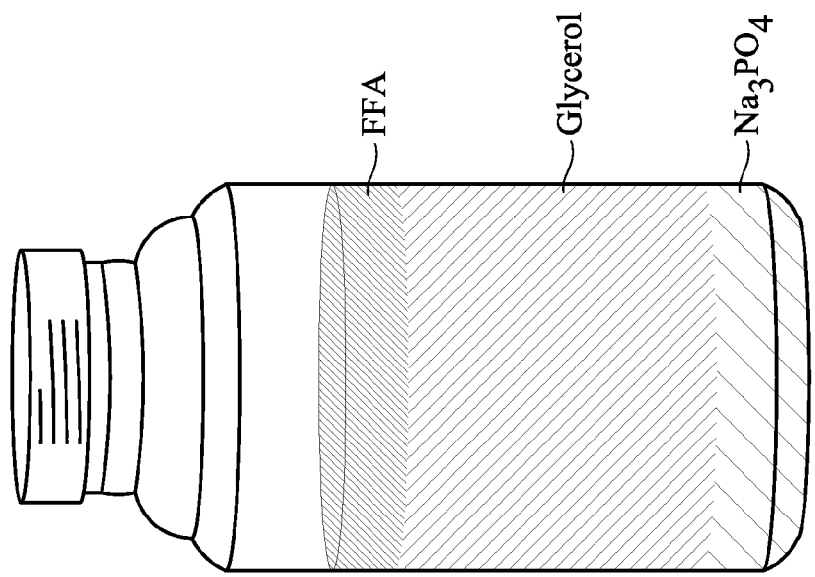
FIG. 1 is a schematic drawing of glycerol splitting using phosphoric acid.

Methods for Controlling and Removing Moisture from Stored Biofuels and Oils

Based upon the experimentation described in the Examples section below, methods for controlling and removing moisture from biofuels, including biodiesel, and oils, including high value plant oils, are described.

The method of the instant invention comprising placing the biofuel or oil in fluid communication with glycerol for a given period of time. Due to the relatively greater hydroscopic properties of glycerol, the glycerol functions as a solvent to extract water from the biofuel or oil while in fluid contact one with the other. After a period of incubation, the glycerol is removed leaving the biofuel, or oil as the case may be, with a reduced moisture content as compared with its moisture content of the bioliquid or oil prior to treatment.

The glycerol and biofuel (or oil) may be placed in direct contact, as for example by direct mixing, and then allowed to separate naturally, or caused to separate mechanically as for example by centrifugation, or both. While this results in good moisture removal from the biofuel (or oil), it can also result in contamination of the biofuel (or oil) by the glycerol and by contaminants that may be found in crude glycerol, such as soaps and acids.

Alternatively, the glycerol and biofuel (or oil) may be placed in fluid communication one with the other through a semi-permeable membrane that allows water molecules to pass but not the glycerol molecules, biofuel molecules, oil molecules, or other molecules that may be contaminants found in the glycerol. The semi-permeable membrane should have a molecular number cut-off smaller than the molecular weight of glycerol to prevent permeation of the glycerol into the biofuel or oil. One such suitable membrane is a cellulose ester dialysis membrane having an approximate molecular weight cut off (MWCO) of 100-500 Daltons.

Cellulose ester dialysis membranes can be damaged by methanol. Crude glycerol and biofuels sometimes contain high concentrations of methanol. As such, cellulose ester membranes would not be indicated in the method of the subject invention when treating biofuels having a high methanol concentration or if treating the biofuel with a crude glycerol having a high methanol concentration.

The glycerol used for the moisture removal treatment may be pure glycerol, crude glycerol, or acid treated crude glycerol. Crude glycerol may be a by-product of biofuel produced from biomass or plant oils. Because pure glycerol has the lowest moisture content, it is most efficient in removing moisture from biofuels and oils. However pure glycerol is expensive relative to crude glycerol and acid treated glycerol. Crude glycerol has lower moisture content than acid treated glycerol and can be used in the method of the described invention with good results.

An alternative preferred embodiment of the method of the instant invention includes the additional step of agitating or shaking the fluids when in contact with one another. The agitation and shaking accelerates the moisture removing process and causes the process to be more efficient.

According to the methods of the disclosed invention, percentage proportions by weight of glycerol to biofuel (or oil) of less than 2% to more than 12% (w/w) are effective. Also according to the methods of the disclosed invention, incubation periods can range from less than 3 hours to 24 hours, with relatively less time if the fluids are agitated during incubation.

The present invention is now described with reference to the following illustrative examples that involved the testing of the glycerol solvent moisture extraction technique described above with respect to biodiesel fuel. Although the illustrative experiments involved the application of glycerol to stored biodiesel fuel, the results of the experiments can logically be extended to other biofuels and plant oils:

EXAMPLES

The following non-limiting examples are provided to further illustrate the embodiments of the methods of the invention disclosed herein. It should be appreciated by those of skill in the art that the techniques disclosed in the examples that follow represent approaches that have been found to function well in practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Biodiesel Samples

Two different kinds of biodiesel were used in the following experiments; one produced from sunflower oil and the other from waste cooking oil. Both types of biodiesel samples were used in a series of laboratory-scale experiments, while only sunflower BDF was tested during the large-scale test.

Glycerol Samples

Three glycerol samples were used: crude glycerol, acid-treated glycerol and pure glycerol (technical grade). The crude glycerol was obtained from a pilot plant as a byproduct of sunflower biodiesel production and has a glycerol content of approximately 65%.

To obtain a higher concentration and to eliminate impurities such as methanol, soap, free fatty acids (FFA) and residual catalyst, the crude glycerol which had a pH of 12 was acidulated by adding an analytical grade phosphoric acid (85%) up to about a pH of 4-4.5. This process disassociated the soap into its sodium salt (since NaOH was used as a catalyst) and FFA, thereby making a distinct separation of fatty acids, glycerol and salt as illustrated in FIG. 1. H3PO4 was selected as a neutralization agent because of the fact that phosphorus is a biogenous element and thus potassium dihydrogen phosphates (containing 28% of potassium and 20% of phosphorus) can be used as fertilizer without further purification (Hajek et al., 2010). Further, first-hand experience showed that the formed precipitates of salts of sulfuric acid were very difficult to filter and filtration took 3 hours compared to only 10 minutes for crystallic precipitates formed when H3PO4 was used for neutralization. The same scenario with sulfuric acid precipitates could be observed when hydrochloric acid is used in the process (Hajek et al., 2010).

Figure 2:
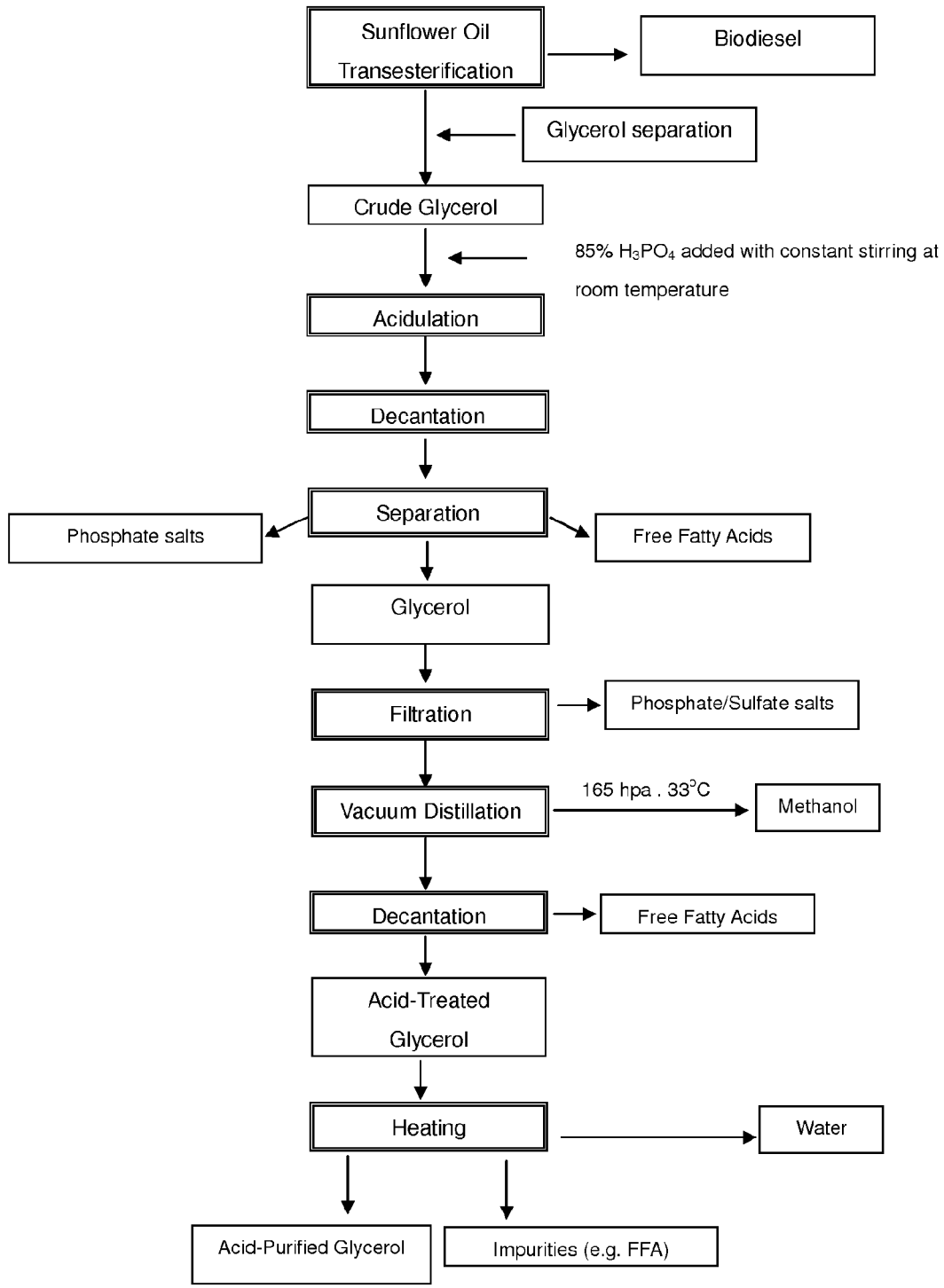
FIG. 2 is a flowchart showing the steps in the purification of crude glycerol obtained from sunflower biodiesel production.

The whole process of obtaining phosphoric acid-treated glycerol (about 90%) is shown in FIG. 2.

Pure glycerol (assayed at 99.0% m/m) was procured from Wako Pure Chemicals, Inc.

Dialysis Membrane and Closures

Two sizes of Cellulose Ester (CE) dialysis membrane tubing were used to contain glycerol in the biodiesel water dialysis experiment. The smaller CE membrane (used for laboratory scale experiment) has a flat width of 15 mm and a diameter of 10 mm while the larger one (for larger scale testing) has 31 mm and 20 mm flat width and diameter, respectively. Both CE members have an approximate molecular weight cut off (MWCO) of 100-500 Daltons.

These tubular membrane were cut into appropriate lengths depending on the amount of glycerol used but allowing extra tubing length (about 10% of total sample volume) to provide space for water. This ensures that the sack will not be damaged due to bursting during water absorption. To seal both ends of the CE membrane, universal closures were used. CE dialysis tubing was inserted into the opened closure and clamped with approximately 3 to 5 mm of tubing extending from the closure (FIG. 4) as per instructions from the manufacturer. The Spectra/Por® CE membrane and universal closures were procured from SPECTRUMLABS.

Moisture Control Experiment of BDF During Storage (Laboratory Tests)

Moisture Removal Capacity of Different Purification Grade Glycerols

Moisture Reduction by Direct Treatment of Glycerol

Glycerol (pure glycerol, phosphoric acid-treated glycerol, and crude glycerol) at 2, 4, 6, 8, 10 and 12% (w/w) was tested for the ability to reduce the moisture content in sunflower BDF. Distilled water was added to the sunflower biodiesel to increase the moisture content (which ranged from 1,700 ppm-2,200 ppm). In each 50-ml centrifuge tube, 10 g of sunflower BDF was mixed with a proportion of glycerol in a vortex mixer. About 30-minute settling time was allowed for each mixture. Complete separation of the mixture was accomplished by centrifugation at 3,000 rpm for 20 minutes. Samples from the upper part (methyl ester layer) was obtained and subjected to Karl Fischer titration for moisture analysis.

The distribution curve of water between BDF and glycerol was also obtained by using pure glycerol whose moisture content was increased with distilled water in a rage from 10,000 to 70,000 ppm. The pure glycerol was mixed with sunflower BDF for longer than 5 hours to ensure the establishment of phase equilibrium.

Moisture Reduction by CE Membrane Dialysis

No Mixing

Figure 3:
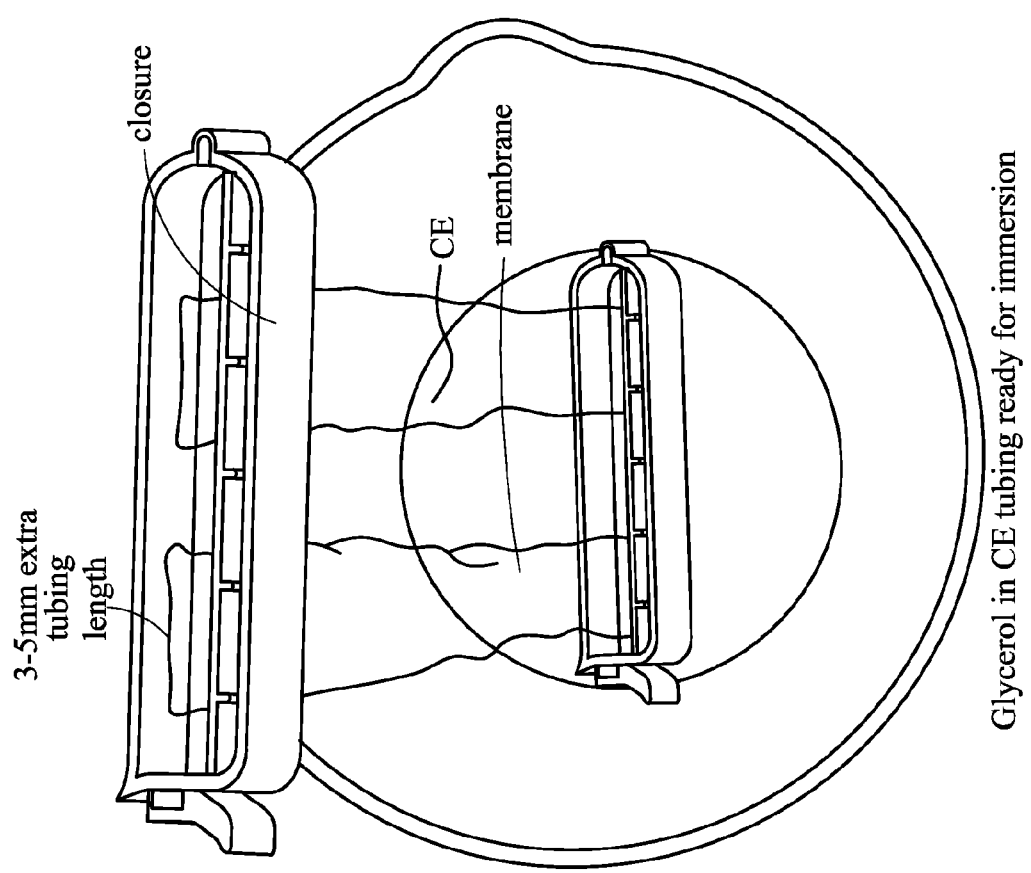
FIG. 3 illustrates from the top glycerol in CE tubing ready for immersion in a container.

Pure glycerol in different percent proportions by weight (2, 4, 6, 8, 10 and 12%) introduced into the CE membrane tubing, illustrated in FIG. 3, was tested for reduced moisture content in sunflower biodiesel and waste cooking oil biodiesel. In a 450-ml glass container, 200 g of biodiesel with increased moisture content (around 1,800 ppm) was used in each treatment. The CE membrane containing glycerol and tightly sealed using universal closures on both ends was immersed in the biodiesel and kept at room temperature without employing any form of mixing or agitation. Sampling for Karl Fischer analysis was done after 3, 6, and 24 hours.

Mechanical Mixing

Similar biodiesel-glycerol proportions as above were used in this test for moisture content reduction. A glycerol-filled CE membrane was immersed into the glass vessel containing biodiesel, tightly closed and mixed using the mechanical mixer at a very low speed/motion. Moisture content determination was done after 3 and 5 hours of shaking.

At 10% (w/w), the three types of glycerol (pure, phosphoric acid-treated and crude) were also used in a separate test to compare their efficiency in the moisture content reduction.

Moisture Control Experiment of BDF During Storage (Large Scale Test)

Figure 4:
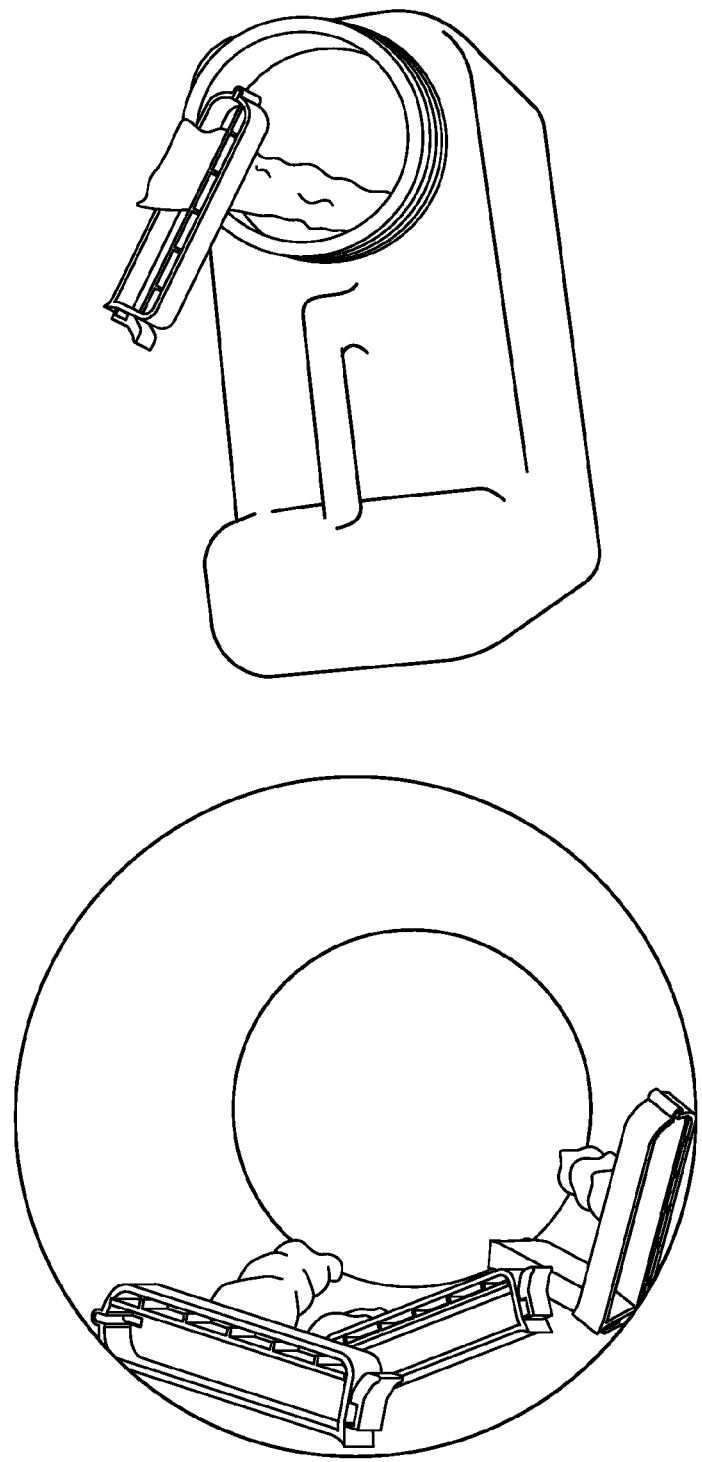
FIG. 4 depicts the immersion of glycerol filled CE membrane tubing in sunflower biodiesel, the left side view taken from the top opening of a container.

The set-up in this experiment was based on the results obtained from the laboratory experiment (water absorption potential of glycerol, biodiesel-glycerol proportion, etc.). Four 10 L high density polyethylene (HDPE) containers were filled up with about 8.8 kg (10 L) of sunflower biodiesel as shown in FIG. 4. One container served as the control and the other three were treated with glycerol. The four treatments were categorized as follows:

T1 - Control
T2 - 4% Pure Glycerol (technical grade)
T3 - 2% Crude Glycerol
T4 - 4% Crude Glycerol Glycerol amount was measured by % w/w. All containers were kept open for the entire duration of the experiment. Karl Fischer Analysis for moisture content was performed everyday for 3 weeks.

Analytical Methods

A preliminary characterization of the glycerol samples in terms of water content, ash content, pH, viscosity and soap content was done using the following methods:

(a) Water Content (in glycerol and biodiesel samples). Karl Fischer Titration
(b) Ash Content. Gravimetric Method
(c) pH. A solution of 20.0 g glycerol in 100.0 ml distilled water; measured using a pH meter (HORIBA pH/Ion Meter F-53).
(d) Viscosity. Yamaichi Electronics Co. Ltd, Digital Viscomate Model VM 100A
(e) Soap Content. Titration with 0.1N HCl with bromphenol indicator
(f) Total Glycerol Content %. Volumetric Analysis
(g) Free Glycerol in Biodiesel. Capillary Gas Chromatography (Column: ZB-5HT)

Results and Discussion

Glycerol Characterization

The characteristics of pure glycerol (technical/commercial grade), crude glycerol from a pilot plant (as a result of sunflower oil transesterification), and phosphoric acid-treated glycerol is shown in Table 2 below:

TABLE 2

| | Glycerol properties | | | | | |
|---|---|---|---|---|---|---|
| Sample | Moisture Content (%) | pH | Soap Content (%) | Ash Content (%) | Glycerol Content (%) | Kinematic Viscosity $(mm^2 \cdot sec^{-1})$ |
| Pure Glycerol | 0.09~0.35 | 5.46~5.56 | n.d. | n.d. | ~99.60 | 136.63 |
| Crude Glycerol | 0.69~0.89 | 12.23~12.52 | 1.8 | 3.00 | ~65.46 | 55.30 |
| Phosphoric Acid-Treated Glycerol | 1.70~2.00 | 2.46~2.61 | n.d | 0.23 | ~93.50 | 102.56 | n.d.—not detected

Crude glycerol pH was found to be between 12-12.5 while pure glycerol had a pH of around 5.5. The alkaline nature of the former is attributed to its soap content and excess NaOH (Yong et al., 2001). The phosphoric acid-treated glycerol had an even lower pH of about 2.5 since the soap and free fatty acids splitting was done at pH 4.0 to 4.5, in which any soap present would have been hydrolyzed. The ash content in crude glycerol was found to be 3.0%, reduced to 0.23% when treated with H3PO4. Evidently, no ash content was detected in pure glycerol and it was found to be the most viscous of all the glycerol samples. Acidulation by phosphoric acid yielded a more concentrated glycerol (more than 90%) as compared to crude glycerol.

However, a thin layer of FFA could still be found on the uppermost layer of the acid-purified samples, which could be further separated by decantation.

Moisture Removal Capacity of Different Purification Grade Glycerols

Distribution of Water Between Glycerol and BDF

Figure 5:
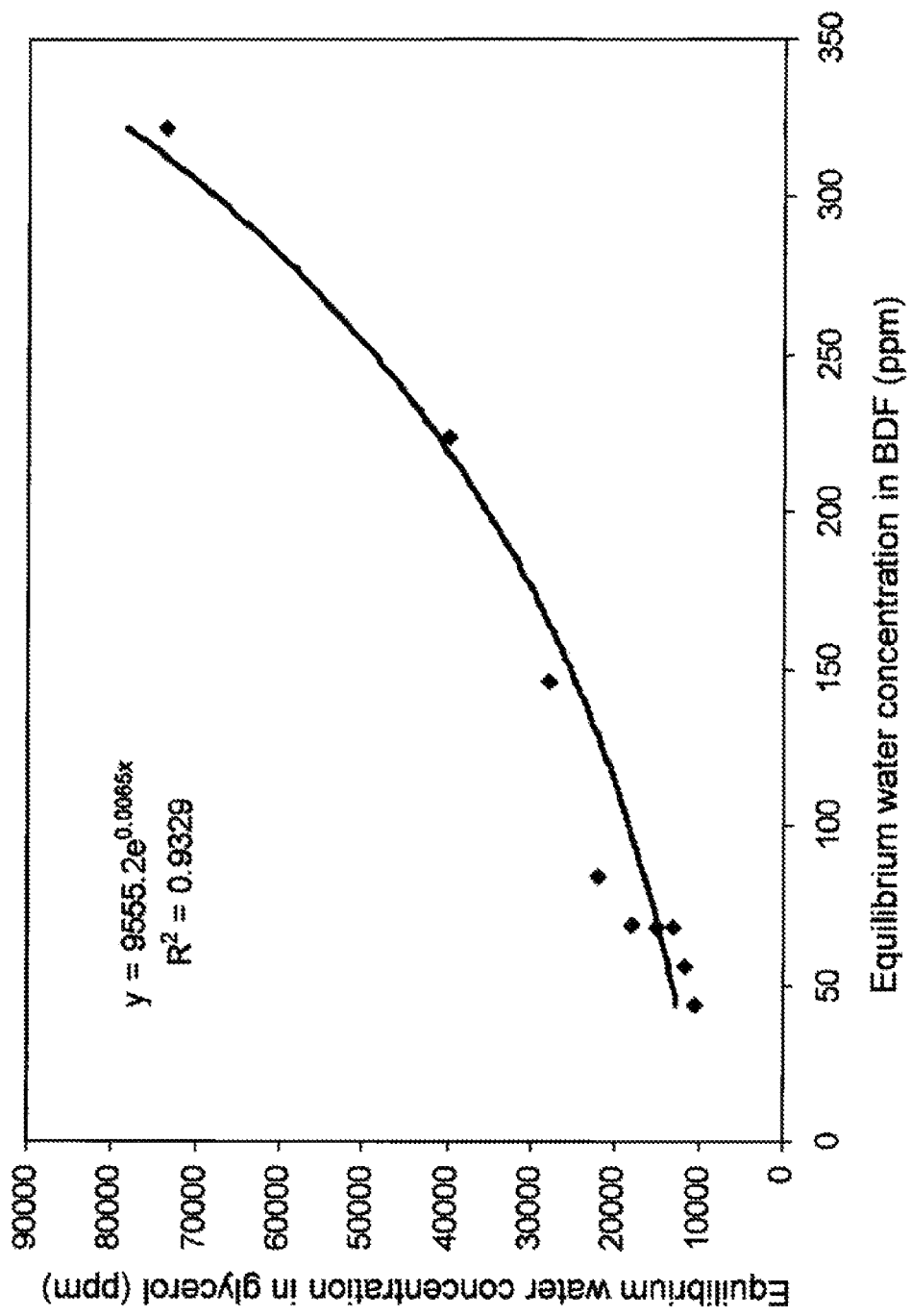
FIG. 5 is a graph demonstrating the distribution of water between BDF and glycerol.

The distribution curve of water between glycerol and BDF is shown in FIG. 5. Glycerol shows an excellent moisture absorption capacity, in which the equilibrium moisture content is 200 times higher than that in BDF. Therefore, the moisture in BDF can be very easily removed by adding a little amount of glycerol as shown in the following experiments.

Direct Treatment of Glycerol

The moisture content values of sunflower biodiesel before and after glycerol treatment are shown in the table depicted in Table 3 below:

TABLE 3

Moisture content in sunflower biodiesel before and after direct treatment of glycerol

| Treatment | Pure Glycerol MC** = 893 ppm | Phosphoric Acid Treated Glycerol MC** = 18,340 ppm | Crude Glycerol MC** = 6,993 ppm |
| --- | --- | --- | --- |
| T (0%) | *1,717.65 | *2173.62 | *1828.26 |
| T (2%) | 936.57 | 727.06 | 623.01 |
| T (4%) | 506.69 | 524.47 | 478.99 |
| T (6%) | 362.03 | 338.50 | 403.99 |
| T (8%) | 305.69 | 324.96 | 394.28 |
| T (10%) | 230.78 | 314.00 | 364.46 |
| T (12%) | 166.69 | 221.38 | 335.05 |

*Initial moisture content of sunflower BDF
**MC; Moisture Content

It can be gleaned from the table above that moisture content in biodiesel could be reduced from 80~90% using 12% (w/w) of glycerol.

Figure 6:
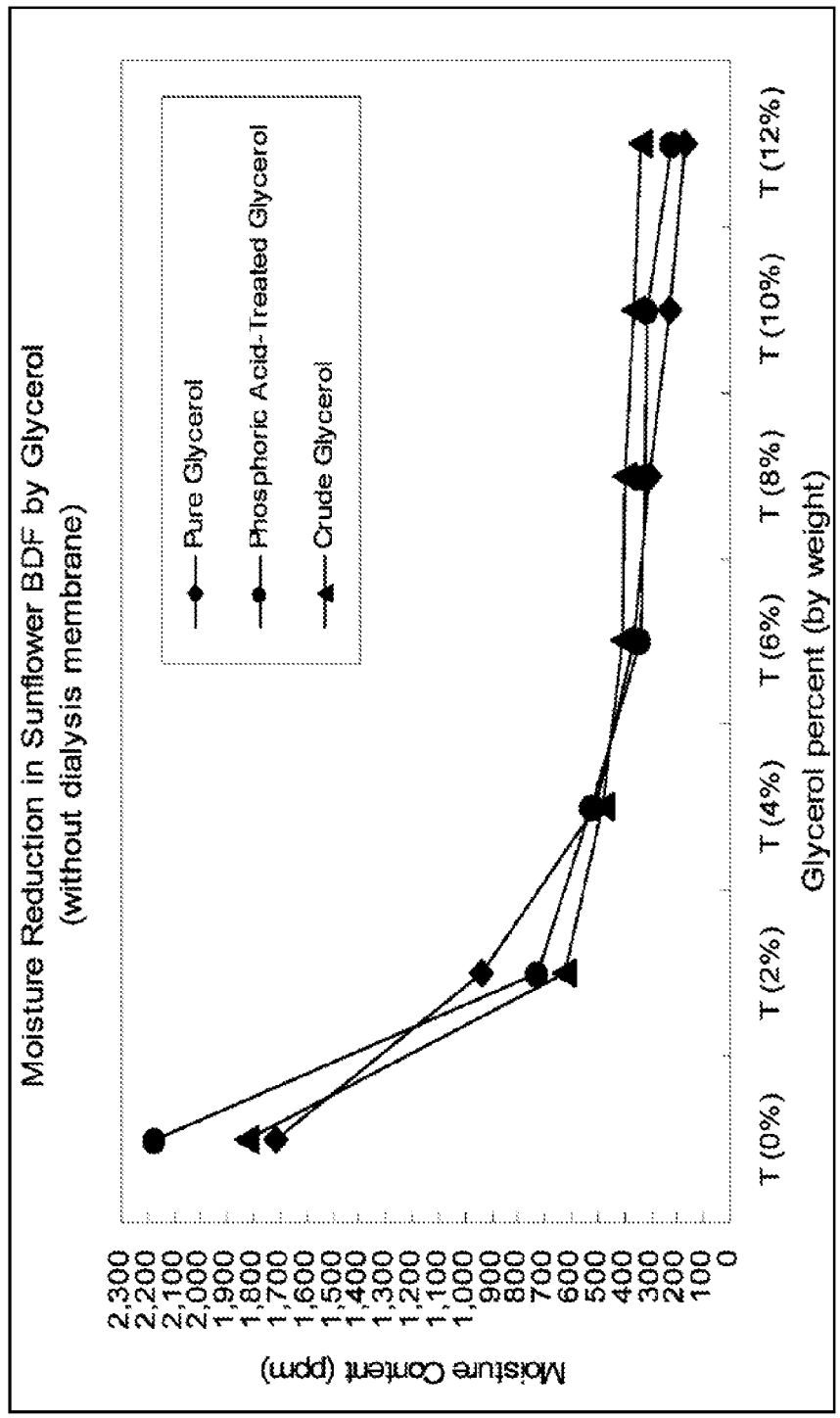
FIG. 6 is a graph showing the moisture reduction potential of glycerol in sunflower biodiesel.

The data presented in FIG. 6 further suggests that lower amounts of crude and phosphoric acid-treated glycerol (2% and 4%) absorb water from the biodiesel faster compared with corresponding amounts in pure glycerol. However, using higher percentages (10% and 12%), pure glycerol displayed the highest water absorption capacity while crude glycerol gave a lower absorption capacity. This could be attributed to the high moisture content of crude glycerol which is 5,000 ppm higher than the moisture content of pure glycerol.

Results indicate the efficiency of direct treatment of the three glycerol grades in the reduction of water content in biodiesel. In addition, capillary gas chromatography results demonstrated zero glycerol contamination in biodiesel treated with 5% and 10% glycerol. However, careful attention should be given during treatment since crude glycerol contains high soap content with a consequent very high possibility of contamination. In the case of the phosphoric-acid treated glycerol, it still contains high acid amounts that could bring about splitting of soaps into free acids and salt (Bambase, 2008). High acid numbers of the treated biodiesel may also result, again attributed to the residual phosphoric acid used in the pre-treatment of glycerol. The use of pure glycerol could be recommended since it contains undetectable soap content and is slightly acidic (pH 5.46~5.56). However, this might not always be practical, because costly treatments like centrifugation and vacuum distillation are required for pure glycerol production. Therefore, CE membrane is used as described in the subsequent sections.

Glycerol Cellulose Ester (CE) Membrane

Figure 7:
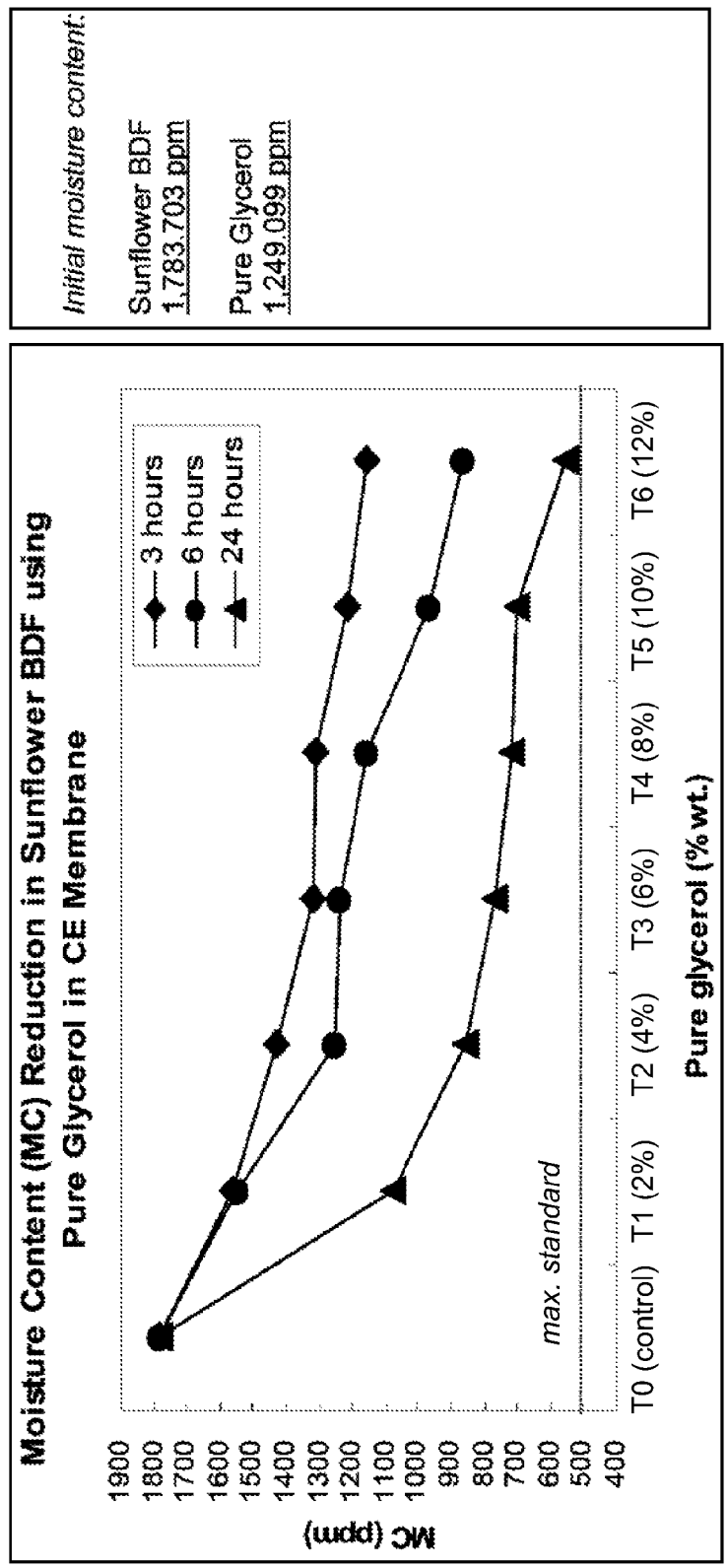
FIG. 7 is a graph illustrating pure glycerol treatment in sunflower biodiesel without shaking.
Figure 8:
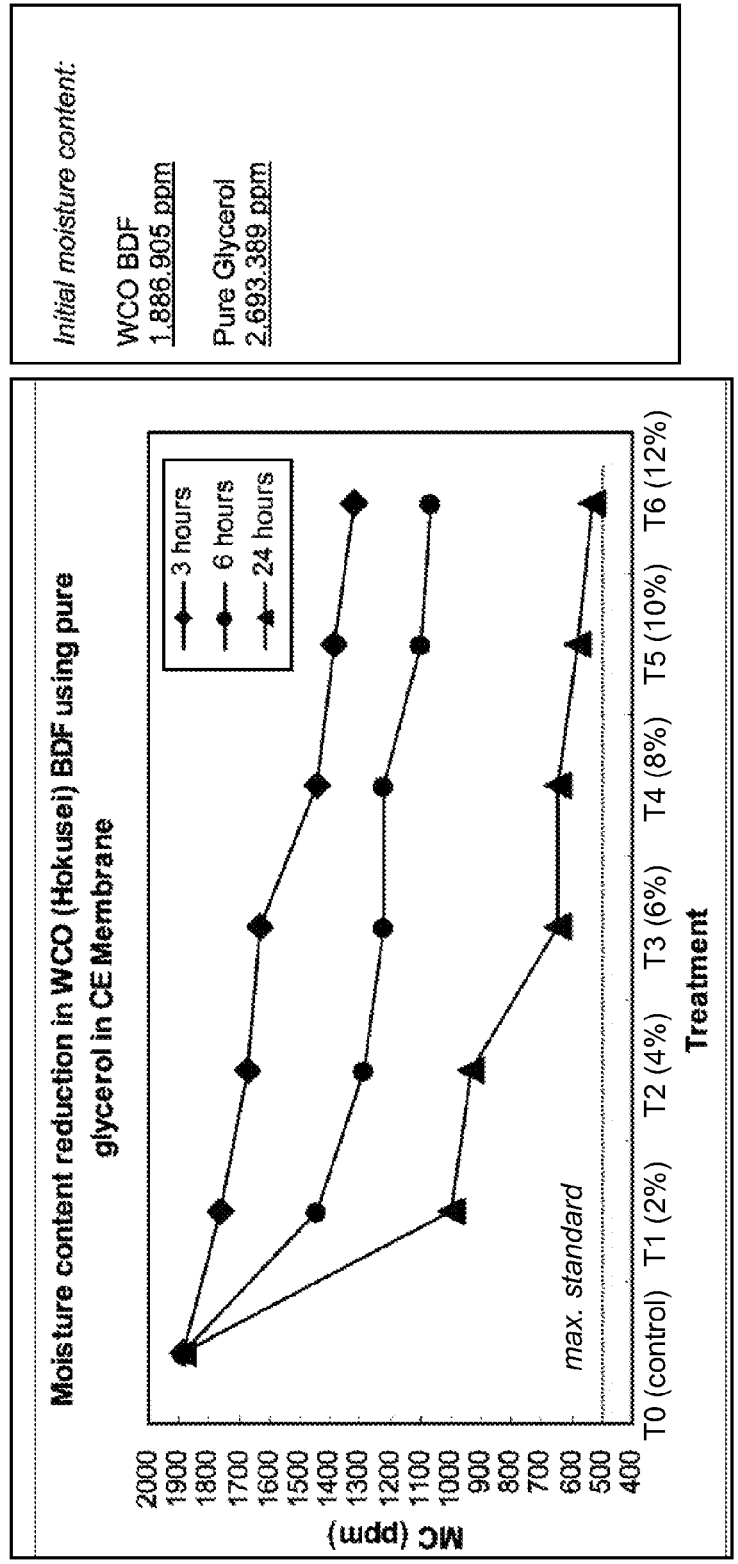
FIG. 8 is a graph showing pure glycerol treatment in waste cooking oil biodiesel without shaking.

The date presented in FIGS. 7 and 8 show similar trends on the reduction of moisture content in both sunflower and waste cooking oil (WCO) BDFs.

After incubating for 24 hours, the moisture content was reduced to 69% and 72% in sunflower and WCO BDF, respectively. Moisture reduction clearly increases with glycerol concentration. However, moisture absorption was found to be faster in the sunflower BDF after 3 and 6 hours. As expected, the rate of absorption depended on the moisture content of the glycerol which in this case, is higher in WCO BDF. The moisture content of the glycerol is considered to be one of the important factors in the process, together with the surface area of the membrane, temperature and atmospheric moisture. Moisture loss in biodiesel was slower than expected. Even with the use of as much as 12% glycerol, and incubating for a long period of time (24 h), the water content was not reduced below 500 ppm (EN 14214 max. standard). Agitation, shaking or any form of mixing was not employed during this treatment.

Figure 9:
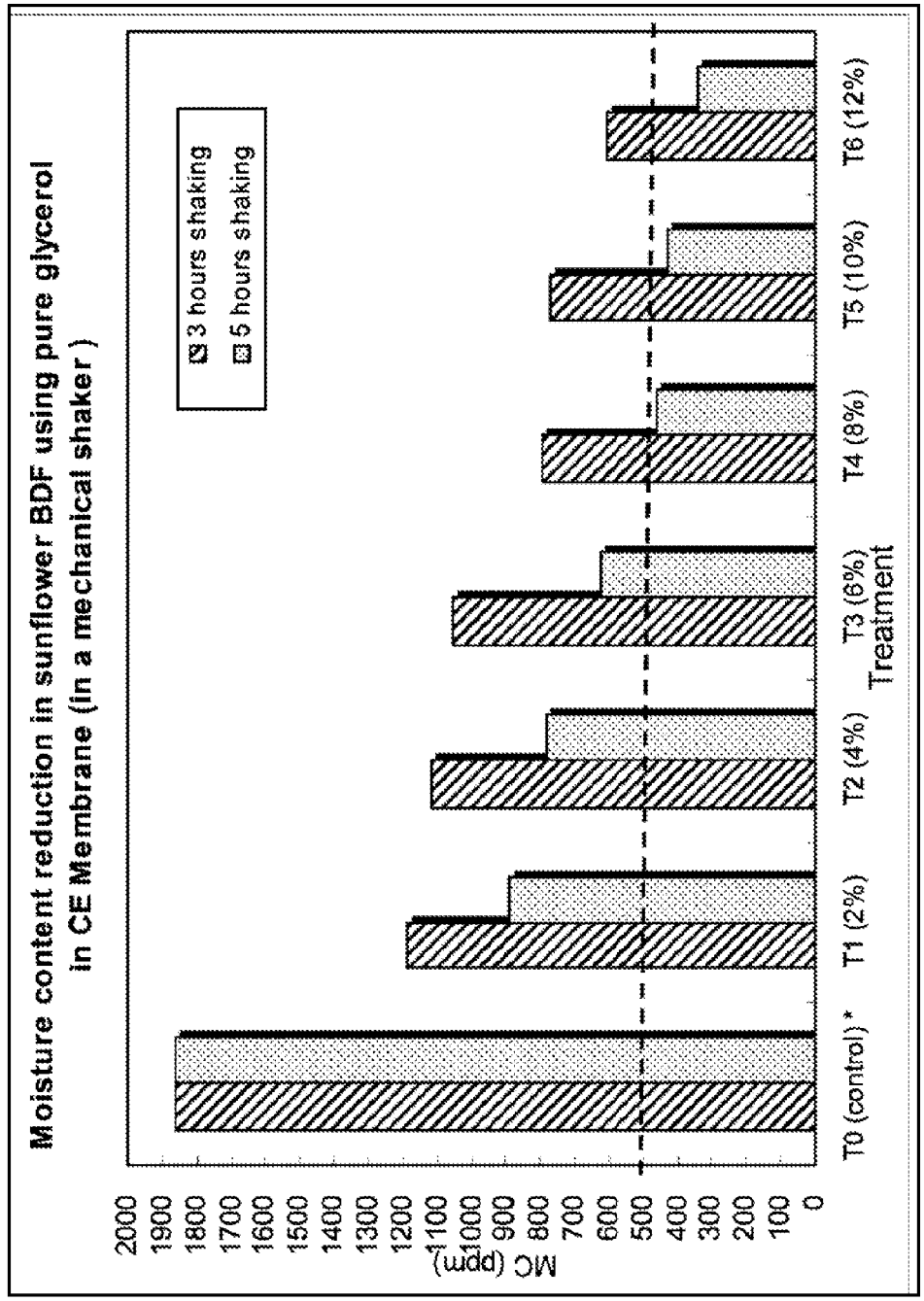
FIG. 9 is a bar chart demonstrating the moisture control reduction in sunflower BDF using pure glycerol in CE membrane with mechanical shaking.

In the experiment that followed, mixing was carried out during the biodiesel-glycerol (in CE membrane) process. Results can be seen in FIG. 9. Gentle shaking (using the mechanical shaker) gave far better results in terms of moisture loss in sunflower BDF. Moisture content was reduced up to 68% in 3 h and 82% in 5 h when 12% of glycerol was used in the treatment. This was even higher than the water loss in biodiesel (treated with 12% glycerol for 24 h) under static condition (no shaking). Water reduction also increased with glycerol amount, and using 8-12% of glycerol decreased biodiesel moisture content to an amount that is lower than the maximum allowed standard (500 ppm) in a span of 5 h.

Figure 10:
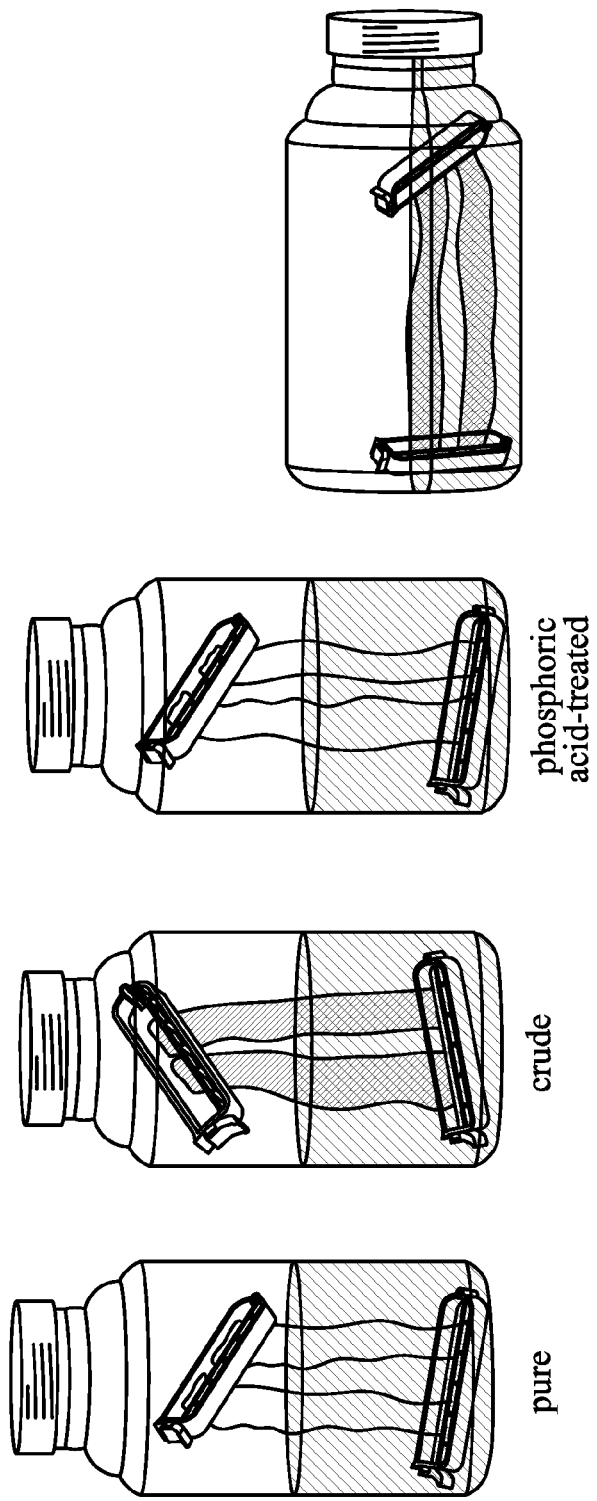
FIG. 10 is a drawing of containers illustrating moisture content reduction in sunflower BDF using 10% pure, crude and phosphoric-acid treated glycerol.
Figure 12:
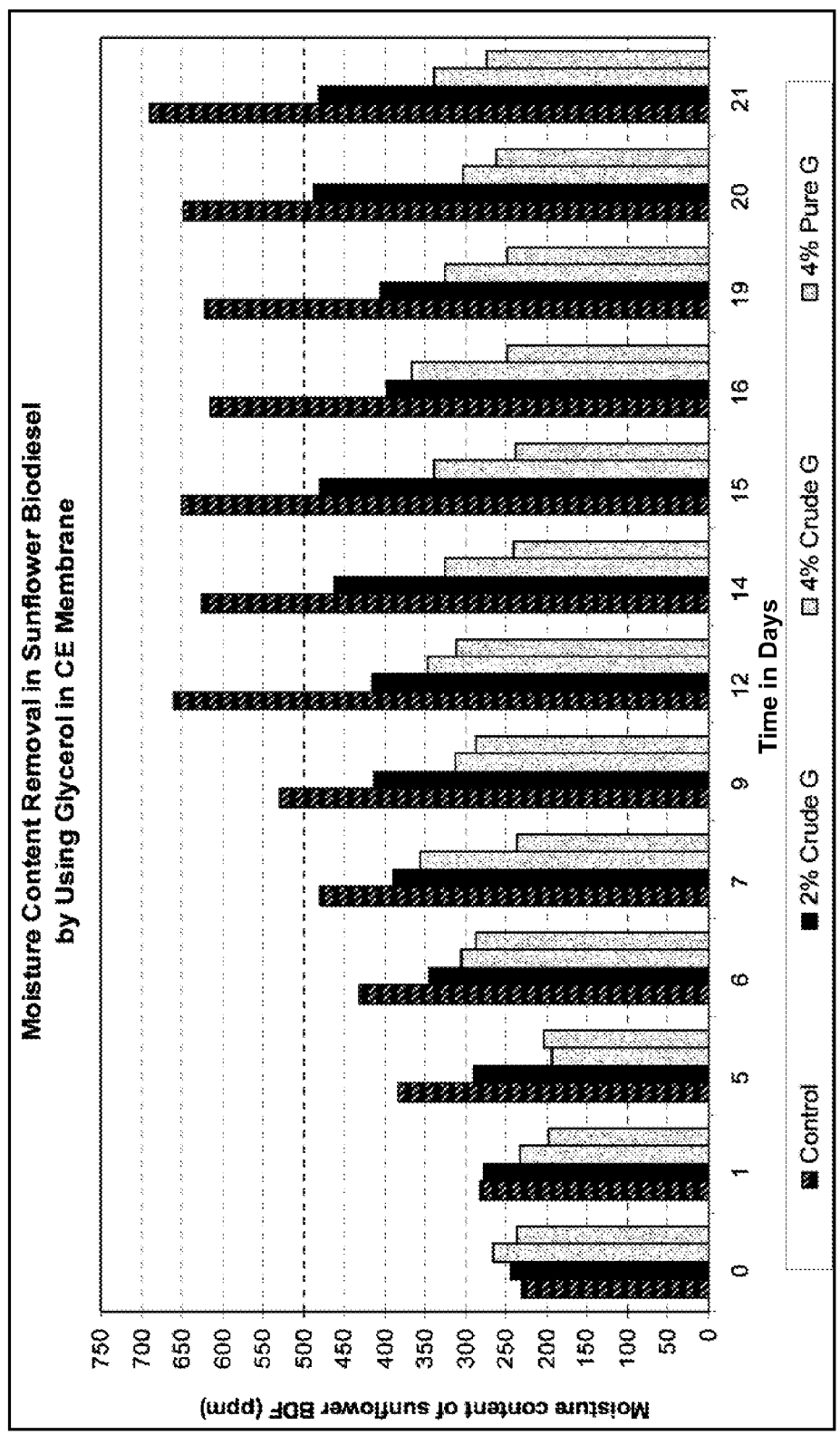
FIG. 12 is a further bar chart showing the removal of moisture content in 10 liters BDF.

Further investigation was done in order to draw comparisons on the efficiency of biodiesel water loss using the three glycerol grades (pure, crude and phosphoric-acid treated) (FIG. 12). Each glycerol grade was used at 10% (by weight), introduced into a CE membrane, immersed into the container containing sunflower biodiesel, and placed on a mechanical shaker in a horizontal position as illustrated in FIG. 10.

Figure 11:
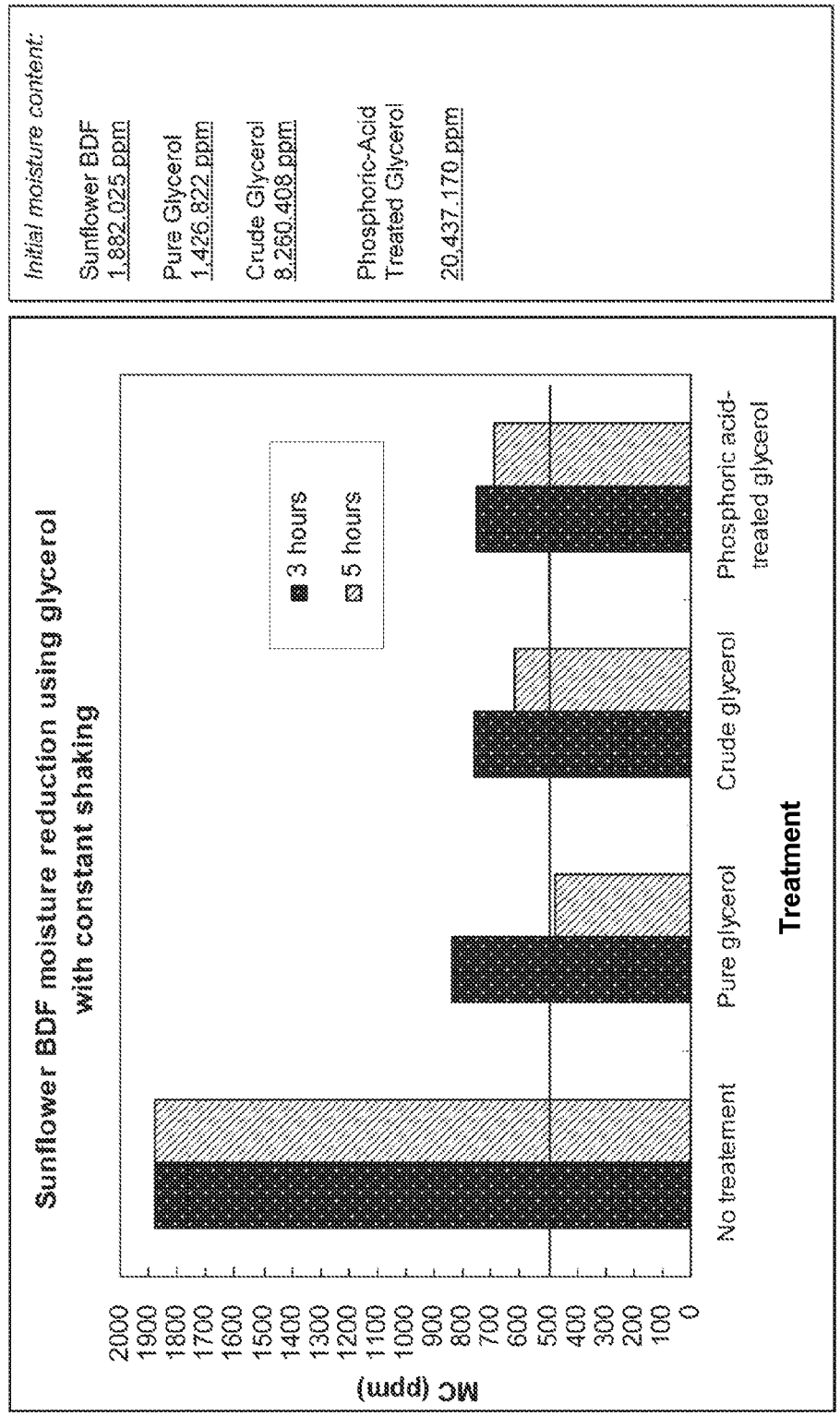
FIG. 11 is a bar chart demonstrating the results of pure, crude and phosphoric-acid treated glycerol treatment of sunflower BDF.

The data presented in FIG. 11 shows the trend of moisture loss in sunflower BDF using different glycerol grades. It is clearly shown in this figure that pure glycerol caused the highest moisture loss as compared to the other two glycerol grades, meeting the moisture content maximum standard of 500 ppm after 5 h incubation.

Again, it can be inferred that this result was largely influenced by the initial water content of the glycerol. The higher the water content of the glycerol, the lower the absorption capacity. This was exemplified by the crude glycerol and phosphoric acid-treated glycerol which had moisture contents of 4 times and 14 times, respectively, higher than the pure glycerol.

Moisture Control Experiment of BDF During Storage

The data presented in FIG. 12 shows the moisture reduction trend in sunflower biodiesel. Initially, the moisture content in sunflower biodiesel was 245 ppm on average. This amount rose to 650 ppm by day 12, and then slightly reduced as days progressed but increased again, up to about 700 ppm, on the last day of sampling, the highest water content observed so far. The 4% pure glycerol treatment maintained the water content in biodiesel for the duration of treatment. The use of 4% crude glycerol was also effective in reducing and maintaining water content below the maximum standard of 500 ppm, however, to a somewhat lesser extent. Crude glycerol when used at the least concentration (2%), also showed remarkable efficiency in absorbing moisture since it also kept the biodiesel in a relatively dry state (below 500 ppm) for 21 days.

These results confirms the effectiveness of the application of glycerol (in CE membrane tubing) in the removal of excess water from biodiesel without leaving any residuals (i.e. soap, glycerol, etc.), including in the case of unpurified glycerol. These results validate crude glycerol as being economically viable the purpose of removing water from BDF since there is no need for any pre-treatment or purification of the crude glycerol before utilizing it for its moisture content reduction qualities.

Summary and Conclusions of Illustrations

From the foregoing experimental results, the following summary and conclusions are drawn.

The pH of crude glycerol was found to be more than 2 times and 6 times the pH of pure glycerol (commercial grade) and phosphoric acid-treated glycerol, respectively. The high pH of the crude glycerol is due to the presence of excess soap/

NaOH (alkali) content. Of the three glycerol grades used in the examples set forth below, the acid-treated glycerol contained the highest moisture, followed by crude glycerol and then pure glycerol. Of all the properties, water content of the glycerol was found to have the greatest influence on its ability to absorb water from biodiesel.

The direct glycerol treatment of biodiesel provides important basic information on moisture absorption capacity of glycerol. Nevertheless, the direct glycerol treatment has a serious problem of biodiesel contamination by residuals in glycerol such as soaps (in crude glycerol), acids (in phosphoric acid-treated glycerol) and glycerol itself.

Agitation and shaking during incubation facilitates moisture content absorption during the treatment. The amount of water removed in 24 h in static condition (no shaking) can be removed in a span of only 5 hours when shaking is employed.

Of the three glycerol grades used for water removal, pure glycerol was the most effective. This is attributed to its low moisture content compared to the two other glycerol grades.

The results of the 10 L biodiesel treatment further substantiated the effectiveness of the application of glycerol (in CE membrane tubing) in the control of moisture during BDF storage without leaving any contaminants (i.e. soap, glycerol, etc.) from unpurified glycerol. Further, the results proved that even without any purification of glycerol, crude glycerol could be used effectively for the purpose, thus making crude glycerol an economically viable by-product of biodiesel production.

Besides water content, it is important to obtain initial information on the methanol content of both glycerol (particularly in crude glycerol) and biodiesel. High methanol concentration in glycerol may damage the CE membrane especially during prolonged period of usage. On the other hand, since methanol and water tend to bond very strongly, water removal in a biodiesel with high methanol content may not be able to be carried out successfully.

The above examples demonstrate glycerol's, and more particularly crude glycerol's, utility as a solvent for extracting moisture from biodiesel. The results of these examples may be extended to predict glycerol's, including crude glycerol's, utility as a solvent for extracting moisture from other bioliquids and from plant oils.

Apparatus for the Application of Membrane Aided Solvent Extraction of Water Using Glycerol Considering the two following important results obtained in the illustrative examples above, different modes for the application of membrane aided solvent extraction of water using glycerol are disclosed. This described technology is classified as perstraction (Matsumura, 1991).

1) The removal rate of moisture from bioliquids is dependent on the initial moisture content of the glycerol employed.

2) Agitation and shaking of the bioliquids during the incubation phase facilitates the moisture removal from the bioliquids.

According to a first preferred embodiment 10 depicted in FIG. 13 of an apparatus for the removal of moisture from biofuels and plant oils, a storage tank 12 is filled with biofuel or plant oil. A cellulose ester (CE) dialysis tubing 14 enclosed within perforated protective cartridge 16 is filled with glycerol and then placed inside the biofuel filled tank 12.

Perforated protective cartridge 16 that encloses tubing 14 protects tubing 14 from puncture or other damage while allowing the biofuel or oil stored within tank 12 to freely enter the cartridge and remain in fluid contact with the entire outside surface of tubing 14.

A rope 18 is attached to one end of cartridge 16. The opposite end of rope 18 is left outside tank 12 during incubation and is used to retrieve the glycerol filled tubing 14 from within tank 12 once the incubation period has completed.

Tank 12 has an opening 20 above for the introduction of the biofuel and tubing 14 and a spigot 22 below for the removal of the dehydrated biofuel, or plant oil, after glycerol treatment.

As explained above, the glycerol used in tubing 14 can be pure glycerol, crude glycerol, or acid treated glycerol, but should not be glycerol having a high methanol concentration. Suitable semi-permeable dialysis membranes having a molecular number cut-off small than the molecular weight of glycerol may be substituted for the CE dialysis tubing 14 described.

Apparatus 10 is effectively used in the context of a fuel tank of a vehicle, for example, which is shaken during the driving. This agitation will accelerate the water extraction process and cause the apparatus to function more efficiently.

Figure 14:
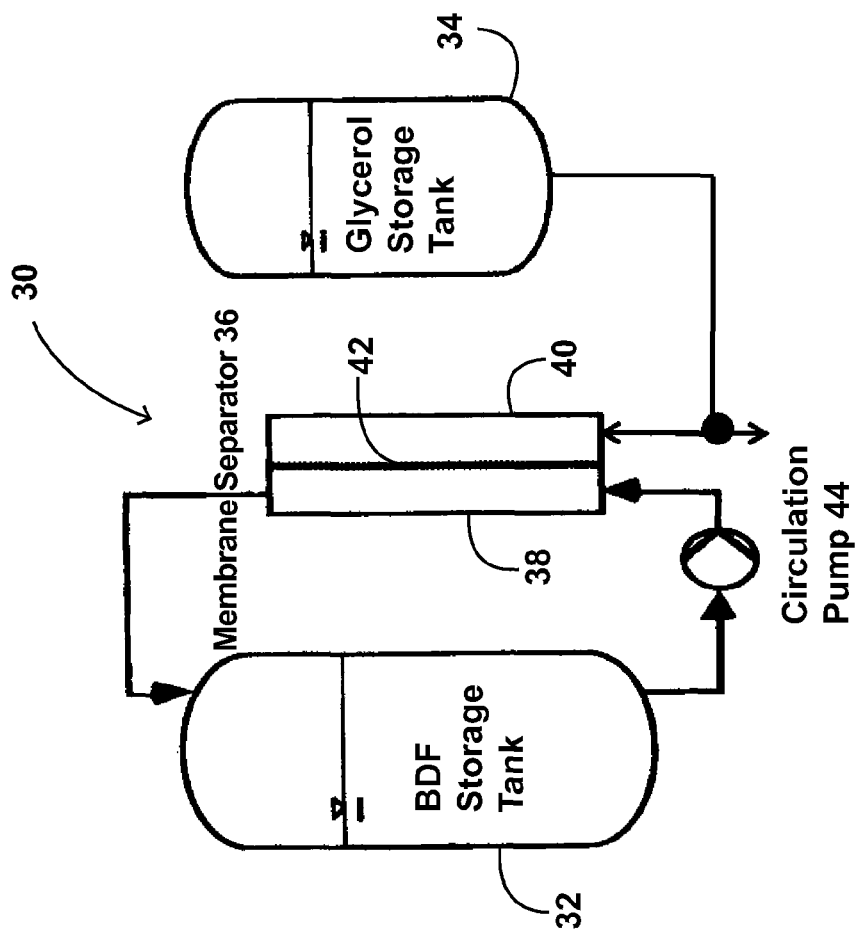
FIG. 14 depicts a second preferred embodiment of an apparatus 30 for the removal of moisture from bioliquids and plant oils that can be used, for example, in the large scale storage of biofuels and oils.

According to a second preferred embodiment 30 depicted in FIG. 14 of an apparatus for the removal of moisture from biofuels and oils, a first container 32 is filled with and stores biofuel or plant oil, while a second container 34 stores glycerol. A hollow-fiber or capillary module or plate exchanger, suitable for use as the membrane separator module 36, has a first side 38 and a second side 40, with a semi-permeable membrane 42 in between. The biofuel from container 32 is circulated through the first side 38 of membrane module 36 at the same time as the glycerol from container 34 is placed in fluid contact with the second side 40 of membrane module 36. Membrane 42 prevents the glycerol from mixing with the biofuel or oil but allows water molecules to pass. Due to the relatively higher hydroscopic properties of the glycerol, water molecules are absorbed by the glycerol from the biofuel or plant oil through membrane 42.

The biofuel may be circulated from container 32 through from the first side 38 of membrane module 36 using a circulation pump 44 installed along the biofuel circulation pathway. Mechanical circulation of the biofuel or plant oil through module 36 accelerates the moisture removal process. Although the glycerol may also be mechanically circulated through module 36, it is not necessary to do so. Rather, it is sufficient to replace frequently the glycerol in container 34 with new glycerol having low moisture content.

Apparatus 30 is particular useful in controlling the moisture content in the large scale storage of biofuels and plant oils. As with apparatus 10, apparatus 30 can be used with pure glycerol, crude glycerol and acid treated glycerol, each in a variety of proportions, a variety of semi-permeable membranes 42 may be employed, and the length of treatment may be varied.

SUMMARY AND SCOPE

As will be appreciated, the methods and apparatus of the disclosed invention provide an economical and straightforward means of controlling the level of moisture in, or removing moisture from, stored biofuels and plant oils.

The method of the described invention can be applied to control moisture content in, and remove moisture from, all varieties of oils including, for example, plant oils, oils derived from microorganisms and oils derived from algae.

The method of the invention provides for a commercially valuable use of crude glycerol which is a common byproduct of biofuel production. The method of the described invention is also energy efficient and can render bioliquid stocks more valuable to the market and more economical to maintain.

The apparatus of the disclosed invention are useful in controlling moisture levels in biofuel and plant oil stocks in vehicle fuel tanks or storage tanks, can be constructed and operated inexpensively and energy efficiently, and can employ crude glycerol derived from biofuel production.

Although the invention has been described with reference to specific embodiments, structures, configurations and methods, this description is not meant to be construed in a limiting sense. Various modifications of the disclosed embodiments, as well as alternative embodiments of the invention, will become apparent to persons skilled in the art upon reference to the description of the invention.

By way of example, a wide variety of apparatus capable of containing biofuels and crude glycerol may be use. The configuration of the containers and storage tanks depicted in the preferred embodiments disclosed may be varied and amplified. A variety of semi-permeable membranes that allow water molecules to pass but not heavier molecules can be substituted for the cellulose ester dialysis members described. The membrane module 36 depicted in FIG. 14 can be adapted to a number of constructions and employ a variety of membranes. The concentration and proportion of glycerol to biofuel or plant oil can be varied. A variety of agitation and shaking methods can be employed as well as a variety of means that produce agitation and shaking. Incubation times can be varied and such times can be varied in conjunction with the amount and nature of agitation. All such modifications should be deemed within the intent and scope of the instant invention, as defined in the following claims.

REFERENCES

Bambase, M. 2008. Improvement of Production Method for the Conversion of Sunflower Oil into Biodiesel by Hydroxide-Catalyzed Transesterification. Dissertation: 130 pp Hájek, M and F. Skopal. 2010. Treatment of glycerol phase formed by biodiesel production. Bioresources Technology 101: 3242-3245

Matsumura, M. 1991. Perstraction. in Extractive Bioconversion edited by Bo Mattiasson and Olle Holst. Marcel Dekker, New York (1991).

Nur, H., M. J. Snowden, V. J. Cornelius, J. C. Mitchell, P. J. Harvey, L. S. Benee. 2008. Colloidal microgel in removal of water from biodiesel. Colloids and Surfaces A: Physicochem. Eng. Aspects. 335: 133-137

Thompson, J. C. and He B. B. (2006). Characterization of crude glycerol from biodiesel production from multiple feedstocks. Applied Engineering in Agriculture, American Society of Agriculture and Biological Engineers Vol. 22 (2) 261-265

Wolfson, A., Gustabo L., Christina D., Yoram S., and Dorith T. 2009. Employing crude glycerole from biodiesel production as an alternative green reaction medium. Industrial Crops and Products 30: 78-81

Yong, K C, T L. Ooi, K. Dzulkefly, W M Z. Wanyunus and A H. Hazimah. 2001. Characterization of Glycereol from a Palm Kernel Oil Methyl Ester Plant. Journal of Oil Palm Research 13: 1-6

The invention claimed is:

1. A method for removing moisture from a plant oil or bioliquid, the method comprising the steps of:
placing the oil or bioliquid in fluid contact with glycerol through a semi-permeable membrane, said membrane permitting moisture to traverse from the oil or bioliquid into the glycerol, but preventing the bioliquid or oil and the glycerol from mixing; and
incubating the fluids for some period of time;
whereby the glycerol functions as a solvent to extract moisture from the plant oil or bioliquid.

2. The method according to claim 1, wherein said semi-permeable membrane has a molecular weight cut-off smaller than the molecular weight of glycerol.

3. The method according to claim 1, wherein the semi-permeable membrane is a cellulose ester dialysis membrane.

4. The method according to claim 3, further comprising:
measuring the methanol content of the bioliquid or oil and the glycerol prior to contacting the one with the other; and
selecting bioliquid or oil and glycerol having a methanol content below that which causes damage to the cellulose ester dialysis membrane.

5. The method according to claim 1, wherein the glycerol is a crude glycerol byproduct from biofuel production.

6. The method according to claim 1, wherein the glycerol is acid-treated glycerol.

7. The method according to claim 1, wherein the glycerol is pure glycerol.

8. The method according to claim 1, wherein the percent proportion by weight of glycerol to bioliquid or oil ranges from 2% to 12% (w/w).

9. The method according to claim 1, wherein the incubation period ranges from 3 hours to 24 hours.

10. The method according to claim 1, further comprising the step of agitating the bioliquid or oil and/or the glycerol during the period of incubation.

11. A method for removing moisture from a bioliquid or oil, the method comprising:
providing a first container;
providing a smaller second container made from semi-permeable membrane, said membrane permitting moisture to traverse from the oil or bioliquid into the glycerol, but preventing the bioliquid or oil and the glycerol from mixing;
wherein said first container is filled with bioliquid or oil containing moisture and said second container is filled with glycerol;
introducing said second container into said first container for a period of incubation sufficient to permit moisture to cross the membrane to the glycerol; and
removing said second container from said first container.

12. The method according to claim 11, wherein said second glycerol filled container is enclosed by a protective case.

13. The method according to claim 11, further comprising agitating the first container is during the period of incubation.

14. The method according to claim 11, wherein the semi-permeable membrane has a molecular weight cut-off smaller than the molecular weight of glycerol.

15. A method for removing moisture from a bioliquid or oil, the method comprising:
providing a first storage tank filled with bioliquid or oil;
providing a second storage tank filled with glycerol;
providing a membrane separator module having a first side and a second side, wherein said first side and said second side are separated by a semi-permeable membrane;
circulating the contents of the first storage tank through the first side of the membrane module;
placing the contents of the second storage tank in fluid contact with the second side of the membrane module and the semi-permeable membrane; and
circulating the contents of the first storage tank through the first side of the membrane separator, wherein said semi-permeable membrane permits moisture to traverse from the oil or bioliquid into the glycerol but prevents the bioliquid or oil and the glycerol from mixing, thereby reducing the moisture content of the bioliquid or oil.

16. The method of claim 15, wherein the first storage tank comprises an inlet conduit, said conduit configured to transfer fluid from the first storage tank to an inlet of the first side of the membrane separator, and an outlet conduit, said conduit configured to transfer fluid from an outlet of the first side of the membrane separator back to the first storage tank, and a circulation pump integrated with either the inlet conduit or the outlet conduit.

17. The method of claim 16, wherein the semi-permeable membrane has a molecular weight cut-off smaller than the molecular weight of glycerol.

18. The method of claim 1, further comprising removing glycerol with the extracted moisture.

* * * * *